United States Patent [19]

McMullen et al.

[11] Patent Number: 4,990,924

[45] Date of Patent: Feb. 5, 1991

[54] SATELLITE LOCATING SYSTEM

[75] Inventors: John W. G. McMullen, Provo, Utah; Gregory A. Magin, Ocala, Fla.

[73] Assignee: Creative Digital, Inc., Orem, Utah

[21] Appl. No.: 382,226

[22] Filed: Jul. 20, 1989

[51] Int. Cl.[5] ........................ H01Q 3/00; H04B 7/185

[52] U.S. Cl. ...................................... 342/359; 342/352

[58] Field of Search ................ 342/352, 354, 443, 359; 455/25

[56] References Cited

U.S. PATENT DOCUMENTS 4,001,828 1/1977 Culpepper .......................... 342/443

4,881,081 11/1989 Yoshihara .......................... 342/359

*Primary Examiner*—Gregory C. Issing

*Attorney, Agent, or Firm*—Thorpe, North & Western

[57] ABSTRACT

A satellite locating system for use in a satellite communication system having a transmitting station in which radio signals with signal identification data is transmitted via a satellite to a receiving station. The receiving station includes an antenna for receiving radio signals relayed by the satellite, a detector circuit located near the antenna for detecting the received signals, a signal processing circuit located remotely from the antenna for processing signals received from the detector circuit, a power supply for producing electrical power, a cable for carrying the power from the power supply to the detector circuit, a power supply for producing electrical power, a cable for carrying the power from the supply to the detector circuit and for carrying received radio signals from the detector circuit to the signal processing circuit, a modulator for causing the voltage level of the output power from the power supply to fluctuate in response to a first control signal and to increase or decrease in response to the level of a second control signal, and an energy level detector couplable to the processing circuit for producing a signal which indicates the energy level of the received radio signals. Also included is a microprocessor coupled to the signal processing circuit and the energy level detector for processing received radio signals and the signal identification data, and for supplying the first control signal to the modulator when the correct signal identification data is received and for supplying the second control signal to the modulator at a level corresponding to the energy level of the received radio signals.

12 Claims, 2 Drawing Sheets

SATELLITE LOCATING SYSTEM

BACKGROUND OF THE INVENTION

This invention relates to a system for aiding a user in aiming a receiving antenna at a satellite from which radio signals are to be received.

The use of orbiting satellites in relaying signals from one ground station to one or more other ground stations has become commonplace in a variety of situations including telephone signal transmission, video or television signal transmission, data transmission, etc. In more recent years, satellites have become an important part of communication systems in which information from a single originating station is relayed via a satellite to multiple receiving stations. The information may be available for all receiving stations, or it may be encoded to identify particular receiving stations which are to recognize and have access to the information. The receiving stations would include processors capable of processing received information to determine if a respective receiving station was to have access to the transmitted information.

In setting up a satellite communication system, it is necessary that each receiving station locate and aim the receiving antenna toward the satellite from which the signals are to be received. Because of the distance of travel of the signals and the usual limited size of receiving antennae or dishes, it is necessary to be very precise in aiming a receiving antenna at the satellite in question. If this is not done precisely, then the received signal may be too weak to enable the accurate recovery of information therefrom.

In video satellite transmission systems, it is common to use a television set and a so-called "squawker" to adjust and aim the antenna at the satellite in question. A "squawker" is a device which may be carried to the roof or other location of a receiving antenna, connected to the antenna, and then operated in conjunction with positioning of the antenna to determine which position yields the strongest signal from the satellite. This approach works well in video satellite systems since the video signals relayed by the satellites in orbit are many in number and easily identified by simply viewing the received television picture to determine if it is the desired program.

In satellite audio/data communication networks, there is usually no video signal to aid in locating the correct signal. There are many satellites in geostationary orbit (the satellites appear to be stationary but are in fact orbiting the earth at the same rate that the earth rotates) and these satellites all relay or transmit similar signals. Thus, the use of a "squawker" is generally ineffective since there is no way to distinguish one satellite from another.

It is typical in satellite audio/data communication to identify a particular signal from a satellite by observing the profile of the received signal on a spectrum analyzer. The installer compares the representation of the received signals on the screen of the spectrum analyzer with that of the desired signal and moves the dish until the correct satellite is located. The installer may then fine-adjust the dish antenna to maximize the strength of the received signal. These spectrum analyzers, as might be expected, are bulky, complicated to use, and expensive.

SUMMARY OF THE INVENTION

It is an object of the invention to provide a simple, inexpensive and easy to use satellite locating system.

It is also an object of the invention to provide such a system which is lightweight and may be readily carried onto a roof or other difficult to access location by a satellite antenna installer.

It is a further object of the invention to provide such a system which can utilize some of the conventional satellite receiving equipment along with equipment of the present invention to aid in aiming a receiving antenna at the correct transmitting satellite.

It is an additional object of the invention to provide such a system which both enables identification of the correct satellite and aids in focusing the antenna more directly towards the desired satellite.

The above and other objects of the invention are realized in a specific illustrative embodiment of a satellite locating system which may be utilized in a satellite communication system having a transmitting station for transmitting radio signals, and a receiving station which includes an antenna for receiving radio signals relayed by a satellite at which the antenna is aimed. The satellite communication system also includes a detector circuit located near the antenna for detecting the received signals, a signal processing circuit located remotely from the antenna for processing signals received from the detector circuit, a power supply for producing electrical power, and a cable for carrying the power from the power supply to the detector circuit and for carrying received radio signals from the detector circuit to the signal processing circuit.

The system of the present invention includes a signal identification data source at the transmitting station for supplying data to identify the satellite signal via which the radio signals are to be transmitted. Included at the receiving station is a modulator for varying the power output in a predetermined manner (for example, periodically varying its voltage or current) in response to a control signal. The system also includes at the receiving station a microprocessor coupled to the signal processing circuit for processing received radio signals and the signal identification data, and for supplying a control signal to the modulator when the correct signal identification data is received. Finally, the system includes a portable transducer which may be connected into the cable adjacent the detector circuit for receiving modulated power from the modulator and for producing an audible signal which is modulated in response to the modulation of the power.

In accordance with one aspect of the invention, the system also includes an energy level detector coupled to the signal processing circuit for producing a signal which indicates the energy level of the received radio signals. The microprocessor responds to this signal from the detector by providing a second control signal to the modulator, causing the modulator to modulate another parameter of the power. The transducer detects the modulation of the other parameter of the power and modulates a parameter of the audible signal accordingly.

It has been found advantageous to vary the voltage of the power between a low voltage of V1 and a high voltage of V2 when the correct signal identification data is received, but otherwise to not vary the power signal if the correct signal identification data is not received. It has also been found advantageous to increase the voltage V2 (or decrease it) as the energy level of the received radio signals increases, and to decrease the voltage V2 (or increase it) as the energy level of the received radio signals decreases. The transducer then produces an audible signal whose pitch varies if the correct identification data is received and whose high end pitch increases (or decreases) as the energy level of the received signals increases and vice versa.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
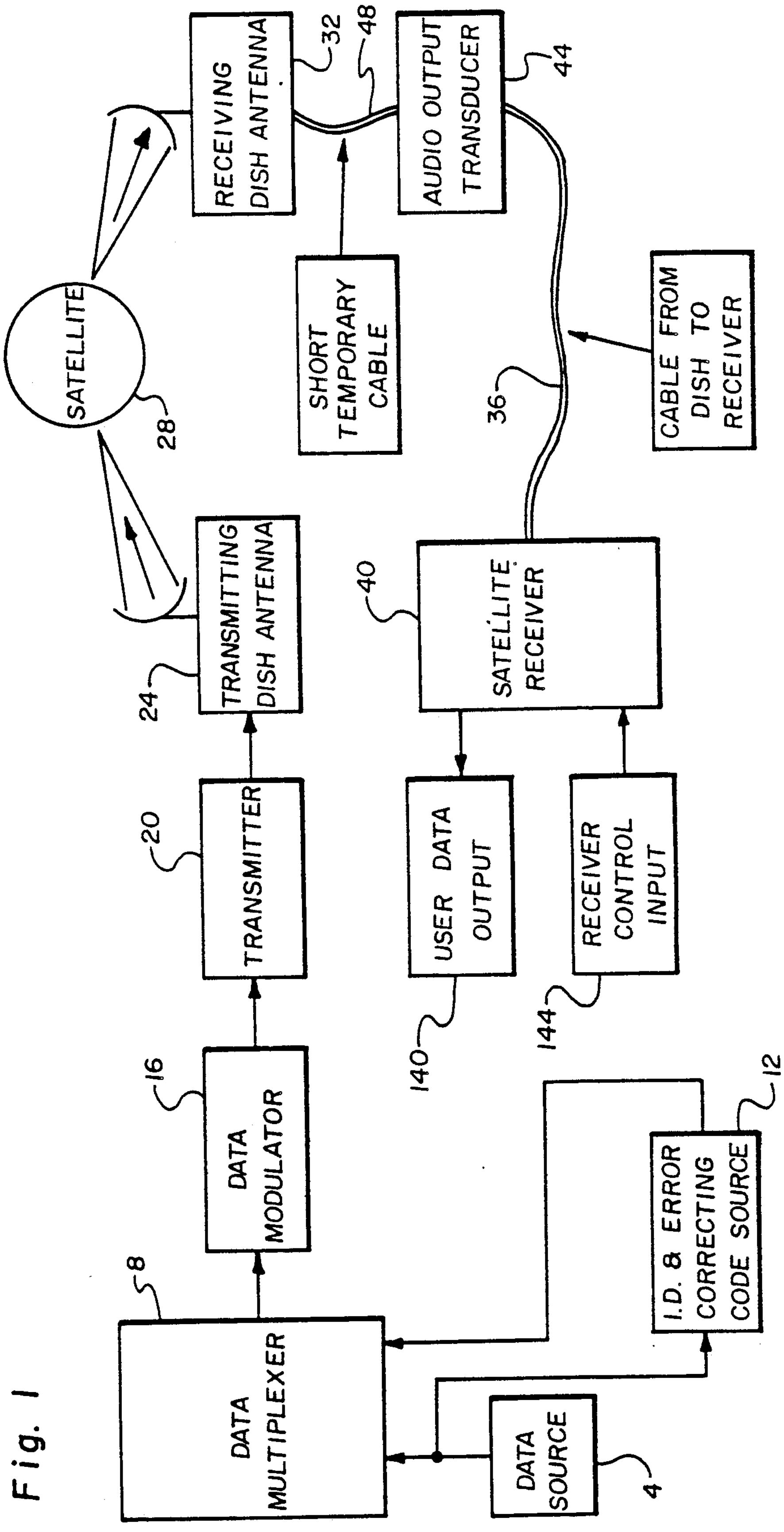
FIG. 1 is a block diagram schematic of a satellite communication system in which the present invention may be used.

Referring to FIG. 1 there is shown a data source 4, such as a personal computer and modem, for supplying data to be transmitted over the satellite communication system. The data source 4 is connected to a data multiplexer 8 and to an identification code and error correcting code source 12. Error correcting characters are generated by the source 12 from the input data and are supplied to the multiplexer along with the data. Also, the source 12 provides signal identification data or codes for identifying the satellite signal on which the data is to be transmitted (and from which the receiving station is to receive the transmitted data).

The data multiplexer 8 may be coupled to other data sources in a conventional manner so that multiple data signals may be transmitted over the same transmission facilities. The data multiplexer 8 supplies the data, identification codes and error correcting characters to a data modulator 16 which modulates the data onto appropriate carrier signals which are then supplied to a transmitter 20. The transmitter 20 operates in conjunction with a transmitting dish antenna 24 to transmit the information to a satellite 28, all in a conventional manner.

The satellite 28 relays, i.e., transmits, the information to ground, to any receiving dish antenna properly aimed at the satellite, such as receiving dish antenna 32. The receiving dish antenna 32 focuses the signal being transmitted from the satellite 28 to in effect amplify the signal. The receiving dish antenna block 32 also includes detector, amplifier and convertor circuitry to detect the received signal, amplify it and convert it to a lower frequency for transmission over a cable 36 to a satellite receiver 40 located remotely from the receiving dish antenna 32. Typically the receiving dish antenna 32 would be located on the roof of a building for better "viewing" of the satellites from which transmission would be received, and the satellite receiver 40 would be located inside the building and connected to the receiving dish antenna by way of a cable 36. An audio output transducer 44, which will be described later, is connectable to and disconnectable from the cable 36 on one side and connectable via a short temporary cable 48 on the other side to the receiving dish antenna 32. As will be explained, the transducer 44 enables an installer on the roof to orient the receiving dish antenna 32 so that it is properly aimed at the satellite 28.

Figure 2:
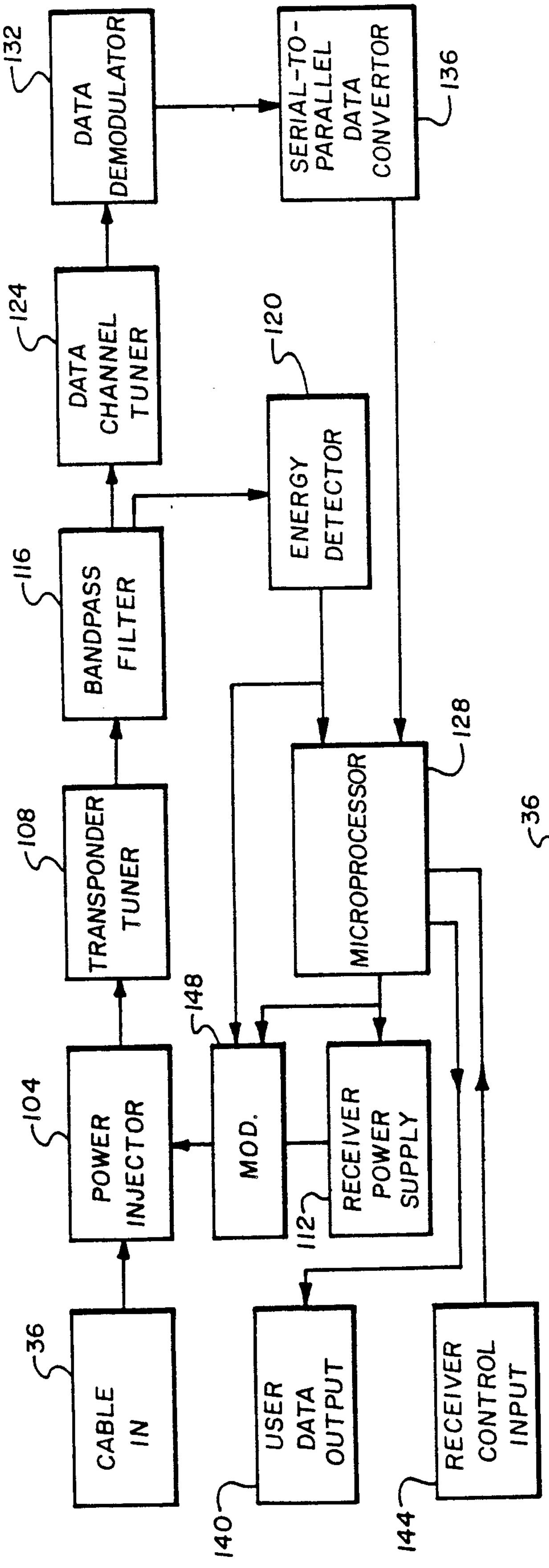
FIG. 2 is a block diagram schematic of the satellite receiver of FIG. 1 made in accordance with the principles of the present invention.

The satellite receiver 40 is shown in detail in FIG. 2 to include a power injector 104 coupled to one end of the cable 36. The power injector 104 enables connection of the cable 36 to both a transponder tuner 108, to which signals received by the receiving dish antenna 32 (FIG. 1) from the satellite 28 are supplied, and a receiver power supply 112, which provides power for powering the circuitry included with the receiving dish antenna 32. In other words, received audio/data signals (and video signals if desired) are carried over the cable 36 to the power injector 104 and then to the transponder tuner 108, while power is received by the power injector 104 from the receiver power supply 112 and supplied to the cable 36 for ultimate supply to the receiving dish antenna circuitry 32. The power injector 104 is a conventional circuit available in satellite receivers of the type described.

The transponder tuner 108 selects from which of a plurality of transponders on the satellite 28, the satellite receiver of FIG. 2 is to receive audio/data (also video if desired) signals. The transponder tuner 108 passes the received signals to a band pass filter 116 which filters the received audio/data signals to remove noise created by other signals on the satellite, by atmospheric conditions, and the like. The filtered signals are then supplied both to an energy detector 120 and a data channel tuner 124. The energy detector 124 detects the energy level of the received signals and supplies a signal to a microprocessor 128 indicating the energy level of the received signals. The energy detector 120 detects the level of the incoming satellite signal and provides a voltage output whose level represents the energy level of the received signals.

Since the received signals may include a number of data channels, for example individual subcarriers if subcarriers are used to carry the information, the data channel tuner 124 selects the particular channel of interest to the satellite receiver of FIG. 2, and transfers those channel signals to a data demodulator 132. The data demodulator 132 demodulates the data channel signals and converts them into a serial digital data stream which is supplied to a serial-to-parallel data convertor 136. As the name implies, the serial-to-data convertor 136 converts the serial input data stream into parallel data for application to the microprocessor 128. The signal processing equipment of FIG. 2 described thus far for processing received audio/data signals is all conventional technology and well known in the art.

The microprocessor 128 generally controls the operation of the satellite receiver of FIG. 2 and processes the incoming data, including decoding the signal identification data to determine if the receiving dish antenna 32 (FIG. 1) is receiving signals from the correct satellite, detecting and correcting errors in the received data, determining from the received data whether the satellite receiver of FIG. 2 is one of those which is to have access to the data, preparing the received data for application to a user data output terminal 140, etc. The user data output terminal 140 might illustratively be a video display device, a printer, or other data utilization device. A receiver input control device 144 allows a user to provide input control signals, data or the like to the microprocessor 128. The microprocessor might illustratively be a Zilog Z80 or an Intel 8088.

A power or voltage modulator 148 is included with the satellite receiver of FIG. 2 to modulate the voltage developed by the receiver power supply 12. Such modulation allows for the transfer of information over the cable 36 to the audio output transducer 44 to assist an installer in properly orienting the receiver dish antenna 32. In particular, the microprocessor 128 utilizes three items of information to modulate the power, these items being the energy level of the received signals (detected by the energy detector 120), the signal identification data contained in the received signals to determine if the receiving dish antenna 32 is receiving from the correct satellite, and the error rate determined from the error detection and correction characters contained in the received data. The microprocessor 128 could utilize these items of information to modulate the power in a variety of ways or via a variety of parameters, but it has been found advantageous to modulate the voltage of the power supply 12. In particular, the microprocessor 128 is programmed to control the modulator 128 to cause the voltage of the power output to fluctuate over a range of voltages from V1 up to V2 if the received signal identification data is correct for the satellite to which the receiving dish antenna 32 is aimed. That is, the voltage of the power output varies periodically over this range of voltages if data is being received from the correct satellite. If the signal identification data indicates that the satellite from which data is being received by the receiving dish antenna 32 is not the correct one, then the voltage developed by the power supply 112 is not caused to fluctuate, but remains essentially steady.

It has also been found advantageous to increase (or decrease) the voltage of the power output as the energy level of the received signals increases and to decrease (or increase) the voltage if the energy level decreases. If the voltage of the power signal is fluctuating because of receipt of the correct signal identification data, then the range of voltages over which this fluctuation takes place is increased as the energy level of the received signals increases, and vice versa. Increased energy level in the received signals indicates the receiving dish antenna 32 is being positioned to more directly focus on the satellite 28. Of course, if the energy level decreases, then that would indicate that the receiving dish antenna 32 is less focused toward the satellite 20.

Finally, it has been found advantageous to utilize the error rate information determined by the microprocessor 128, to increase the rate at which the voltage of the power output is modulated when the error rate decreases and to decrease the rate when the error rate increases. An increased error rate indicates, for example, that signals from more than one satellite are being received, that trees or other interfering objects are between the receiving dish antenna 32 and satellite 28, etc.

Figure 3:
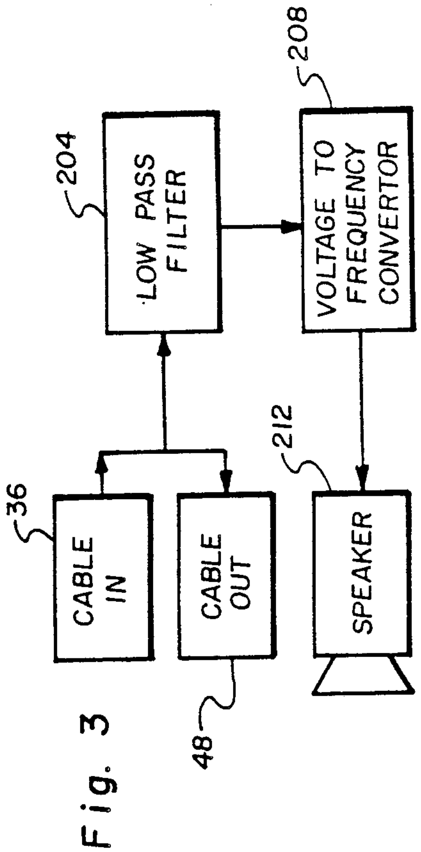
FIG. 3 is a block diagram schematic of the audio output transducer of FIG. 1, also made in accordance with the principles of the present invention.

The modulated power is applied to the power injector 104 and then to the cable 36 for application to the audio output transducer 44 which has been inserted between the cable 36 and the receiving dish antenna 32 (FIG. 1). The audio output transducer 44 is shown in detail in FIG. 3 to include a low pass filter 104 for blocking received audio/data signals 32 which are passed over the cable to the satellite receiver 40, while passing a portion of the modulated power to a voltage-to-frequency convertor 208. The voltage-to frequency convertor 208 converts the modulated power to an audio frequency drive signal for application to a speaker 212. The frequency of the drive signal is determined by the voltage level of the received power. The audio frequency drive signal drives the speaker 212 to produce an audible tone which is either steady (if the receiving dish antenna 32 is not aimed at the correct satellite) or fluctuating (if the receiving dish antenna 32 is aimed at the correct satellite) as determined by the received signal identification data. Also, as the receiving dish antenna 32 is adjusted by the installer to more directly focus on the satellite 28, the pitch of the tone increases (or decreases), whereas if the receiving dish antenna 32 is moved away from a direct aim at the satellite, the pitch of the tone decreases (or increases). The rate of fluctuation of the tone also increases as the error rate decreases and vice versa.

Production of the audible tone by the transducer 44 and modulation of the tone serve to aid an installer typically carrying out installation on a roof top in appropriately aiming the receiving dish antenna 32. Causing the pitch of the tone to fluctuate when the receiving dish antenna 32 is aimed at the right satellite allows for ease of recognition by the installer that the correct satellite has been found. A fluctuating tone is easy to distinguish from a steady tone. Also, it is easy to distinguish a high pitch from a lower pitch, indicating that the received signal strength is higher or lower and that the receiving dish antenna 32 is properly focused on the satellite.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. In a satellite communication system having a receiving station which comprises an antenna for receiving radio signals relayed by a satellite at which the antenna is aimed, said signals including signal identification data for identifying said satellite, circuit means located near the antenna for operating upon the received signals, signal processing means located remotely from the antenna for processing signals received from the circuit means, power supply means for producing electrical power, and cable means for carrying power from the power supply means to the circuit means and for carrying received radio signals from the circuit means to the signal processing means, a system for aiding a user in aiming the antenna toward the satellite comprising means for modulating the power in a predetermined manner in response to a first control signal, a processor unit responsive to receipt of the signal identification data for supplying a first control signal to said modulating means, and transducer means connectable into said cable means adjacent the circuit means for receiving modulated power from the modulating means and for producing an audible signal whose characteristics are determined by the modulated power.

2. A system as in claim 1 further including means for detecting the energy level of the received signals supplied by the circuit means to the signal processing means, said processor unit including means responsive to said detecting means for supplying a second control signal to the modulating means to cause the modulating means to vary a parameter of the power output from the power supply means in accordance with the variation in energy level of the received signals, and said transducer means including means for producing a variation in the audible signal in response to the variation in said parameter of said power signal.

3. A system as in claim 2 wherein the output of said power supply means normally has a fixed voltage level, wherein said modulating means includes means responsive to the first control signal for varying the voltage level of the output power between a low voltage of V1 and a high voltage of V2, and wherein said transducer means includes means for varying the frequency of the audible signal in accordance with the variation in voltage level of the output of the power supply means.

4. A system as in claim 3 wherein said second control signal indicates the energy level of the received signals, and wherein said modulating means includes means responsive to said second control signal for controlling the voltage V2 to be proportional to the energy level of the received signals.

5. A system as in claim 4 wherein said transducer means includes a filter means for blocking said received signals, a converter means for converting the voltage level of the power output to an audio drive signal whose frequency is determined by the voltage level and is in the audio range, and speaker means responsive to said audio drive signal for producing an audible tone whose pitch varies with variation in the frequency of the audio drive signal.

6. A system as in claim 2 wherein the output of said power supply means normally has a fixed voltage level, wherein said second control signal indicates the energy level of the received signals, wherein said modulating means includes means responsive to said second control signal for increasing the voltage level of the power as the energy level of the received signals increases, and for decreasing the voltage level of the power as the energy level of the received signals decreases, and wherein said transducer means includes means for varying the frequency of the audible signal in response to the variation in voltage of the power.

7. A system as in claim 2 wherein the output of said power supply means normally has a fixed voltage level, wherein said second control signal indicates the energy level of the received signals, wherein said modulating means includes means responsive to said second control signal for decreasing the voltage level of the power as the energy level of the received signals increases, and for increasing the voltage level of the power as the energy level of the received signals decreases, and wherein said transducer means includes means for varying the frequency of the audible signal in response to the variation in voltage of the power.

8. A system as in claim 2 wherein said received signals include error detecting information, said processor unit including means for determining the error rate of the received signals and for supplying a third control signal to the modulating means to cause the modulating means to vary a second parameter of the output of the power supply means in accordance with the variation in the error rate of the received signals, and said transducer means including means for producing a variation in the audible signal in response to the variation in said second parameter of the power.

9. A system as in claim 8 wherein the output of said power supply means normally has a fixed voltage, wherein said third control signal indicates the error rate of received signals, wherein said modulating means includes means responsive to said third control signal for increasing the voltage of the power output as the error rate decreases, and for decreasing the voltage of the power output as the error rate increases, and wherein said transducer means includes means for varying the frequency of the audible signal in response to variation in voltage of the output power.

10. A satellite communication system comprising a transmitting station including means for transmitting radio signals with signal identification data for identifying a particular satellite, and a receiving station including an antenna for receiving radio signals relayed by a satellite at which the antenna is aimed, circuit means located near the antenna for operating upon the received signals, signal processing means located remotely from the antenna for processing signals received from the circuit means, power supply means for producing electrical output power normally having a fixed voltage level, cable means for carrying power from the power supply means to the circuit means and for carrying received radio signals from the circuit means to the signal processing means, means for varying a parameter of the output power by an amount proportional to the value of a control signal, means for detecting the energy level of the received signals supplied by the circuit means to the signal processing means, a microprocessor responsive to the detecting means for supplying a control signal to the parameter varying means, where the value of said control signal varies with the variation in energy level of the received signals, and transducer means couplable into and decouplable from said cable means adjacent the circuit means for receiving output power from the parameter varying means when coupled into said cable means, and for producing an audible signal, one of whose parameters varies in response to variation of the said parameter of the output power.

11. A system as in claim 10 wherein said parameter of the output power is voltage level, and wherein said transducer includes means for producing an audible tone whose frequency varies with variation in the voltage level of the output power.

12. A system as in claim 11 wherein said microprocessor supplies to the parameter varying means a control signal, upon receipt of the signal identification data, and wherein said parameter varying means includes means for periodically varying the voltage level of the output power in response to said control signal.

* * * * *